(12) United States Patent
Watai et al.

(10) Patent No.: US 7,357,578 B2
(45) Date of Patent: Apr. 15, 2008

(54) THRUST SLIDING BEARING

(75) Inventors: Tadashi Watai, Fujisawa (JP);
Kazuyuki Miyata, Fujisawa (JP);
Atsushi Ueno, Fujisawa (JP); Ryohei Kaneko, Fujisawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 11/652,620

(22) Filed: Jan. 12, 2007

(65) Prior Publication Data

US 2007/0116391 A1 May 24, 2007

Related U.S. Application Data

(63) Continuation of application No. 10/500,068, filed as application No. PCT/JP03/00410 on Jan. 20, 2003, now Pat. No. 7,198,406.

(30) Foreign Application Priority Data

Jan. 22, 2002 (JP) ............... 2002-013582

(51) Int. Cl.
*F16C 17/04* (2006.01)

(52) U.S. Cl. ................ 384/420; 384/368

(58) Field of Classification Search ........ 384/121, 384/303, 304, 368, 369, 420–427
See application file for complete search history.

(56) References Cited

U.S. PATENT DOCUMENTS

| | | |
|---|---|---|
| 2,872,256 A | 2/1959 | Thomson |
| 3,837,039 A | 9/1974 | Rehrig |
| 4,239,301 A | 12/1980 | Pannwitz |
| 4,854,745 A | 8/1989 | Kamimura et al. |
| 4,907,289 A | 3/1990 | Kamimura et al. |
| 4,923,312 A | 5/1990 | Kamimura et al. |
| 4,969,752 A | 11/1990 | Kubota et al. |
| 5,170,212 A | 12/1992 | DeCecca |
| 5,476,326 A | 12/1995 | Ueno et al. |
| 2004/0240761 A1 | 12/2004 | Watai et al. |

FOREIGN PATENT DOCUMENTS

| | | |
|---|---|---|
| JP | 11-013768 | 1/1999 |
| JP | 11-303873 | 11/1999 |
| WO | 02/068835 | 9/2002 |

OTHER PUBLICATIONS

Microfilm of the specification and drawings annexed to the request of Japanese Utility Model Application No. 037230/1988 (Laid-open No. 141926/1989) (Oiles Corp.), Sep. 28, 1989.
CD-Rom of the specification and drawings annexed to the request of Japanese Utility Model Application No. 036861/1991 (Laid-open No. 122812/1992) (Sumitomo Construction Machinery Co., Ltd), Nov. 5, 1992.
Microfilm of the specification and drawings annexed to the request of Japanese Utility Model Application No. 005957/1987 (Laid-open No. 115917/1988) (Oiles Corp.), Jul. 26, 1988.

*Primary Examiner*—Thomas R. Hannon
(74) *Attorney, Agent, or Firm*—Nixon & Vanderhye P.C.

(57) ABSTRACT

A thrust sliding bearing includes an upper casing having a polyacetal resin-made flat annular surface and a lower casing superposed on the upper casing so as to be rotatable about an axis of the upper casing and having a polyacetal resin-made annular surface opposing the annular surface of the upper casing.

29 Claims, 8 Drawing Sheets

THRUST SLIDING BEARING

CROSS-REFERENCE TO RELATED APPLICATIONS

This application is a continuation of U.S. application Ser. No. 10/500,068, filed Jun. 25, 2004, now U.S. Pat. No. 7,198,406, which is a U.S. national phase of International Application PCT/JP03/00410, filed in Japanese on 20 Jan. 2003, which designated the United States. PCT/JP03/00410 claims priority to JP Application No. 2002-13582 filed 22 Jan. 2002. Each application is incorporated herein by reference in its entirety.

TECHNICAL FIELD

The present invention relates to a thrust sliding bearing, and more particularly to a synthetic resin-made thrust sliding bearing which is suitably incorporated in a strut-type suspension (Macpherson type) in a four-wheeled vehicle.

BACKGROUND ART

In general, a strut-type suspension is mainly used in a front wheel of a four-wheeled vehicle, and is constructed such that a strut assembly incorporating a hydraulic shock absorber in a cylinder formed integrally with a main shaft is combined with a coil spring. Among such suspensions, there is a type of structure in which the axis of the coil spring is actively offset with respect to the axis of the strut, so as to allow the sliding of a piston rod of the shock absorber incorporated in the strut to be effected smoothly. There is another type of structure in which the coil spring is disposed by aligning the axis of the coil spring with the axis of the strut. In either structure, a thrust bearing is disposed between a mounting member of a vehicle body and an upper spring seat of the coil spring to allow the rotation to be effected smoothly when the strut assembly rotates together with the coil spring by the steering operation.

In this thrust bearing, a rolling bearing using balls or needles or a synthetic resin-made sliding bearing is used. However, the rolling bearing has a possibility that fatigue failure occurs in the balls or needles due to fine vibrations and vibration load or the like, and there is a problem in that it is difficult to maintain smooth steering operation. The thrust sliding bearing has problems in that since its friction torque is high as compared with the rolling bearing, an increase in the thrust load results in an increase in the friction torque, which renders the steering operation heavy, and that, depending on a combination of synthetic resins, the stick-slip phenomenon occurs, frequently producing frictional noise attributable to the stick-slip phenomenon.

In addition, a lubricant such as grease is applied to the sliding bearing, and the above-described frictional noise practically does not occur insofar as such a lubricant is present, as desired, on the sliding surface. However, there can be cases where the frictional noise begins to be produced due to the dissipation or the like of the lubricant over long periods of use.

It should be noted that the above-described problems do not necessarily occur only in the thrust sliding bearing incorporated in the strut-type suspension, but can similarly occur in general thrust sliding bearings.

The present invention has been devised in view of the above-described aspects, and its object is to provide a thrust sliding bearing in which even if the thrust load increases, the friction torque practically does not change to make it possible to form the sliding surface with a low friction torque and maintain such a low coefficient of friction over long periods of use, and which is free of the occurrence of frictional noise at the sliding surface, and, when incorporated in the strut-type suspension, makes it possible to secure smooth steering operation equivalent to that of the rolling bearing.

DISCLOSURE OF THE INVENTION

A thrust sliding bearing in accordance with the invention comprises: an upper annular body having an annular surface, and a lower annular body having an annular surface opposing the annular surface of said upper annular body and superposed on the upper annular body so as to be rotatable about an axis of the upper annular body, the annular surface of one of the annular bodies being formed of a synthetic resin and being flat, a closed recess surrounded by synthetic resin-made projections abutting slidably against the annular surface of the one annular body being formed in the annular surface of another one of the annular bodies, and a fluid being adapted to be filled in said closed recess.

According to the thrust sliding bearing in accordance with the invention, a closed recess surrounded by synthetic resin-made projections abutting slidably against the annular surface of one annular body is formed in the annular surface of the other annular body, and a fluid is adapted to be filled in the closed recess. Therefore, the thrust load can also be received in a shared manner by the fluid filled in the closed recess. As a result, the sliding surface of the other annular body with respect to the annular surface of the one annular body is constituted by surfaces of the projections contacting the annular surface of the one annular body and by the surface of the fluid filled in the closed recess. Thus, the thrust sliding bearing has an extremely low coefficient of friction due to the contact surface of the fluid. Accordingly, the relative rotation of the other annular body about the axis of the one annular body with respect to the one annular body can be effected with an extremely low frictional resistance even under the thrust load. Moreover, since such a fluid is filled in the closed recess, it is possible to maintain a low coefficient of friction over long periods of use, and eliminate the occurrence of frictional noise at the sliding surface. Also, even when the thrust sliding bearing is incorporated in the strut-type suspension, it is possible to secure smooth steering operation equivalent to that of the rolling bearing.

The thrust sliding bearing of the invention is preferably adapted to receive a thrust load by the projections and the fluid filled in the closed recess.

The projections may be adapted to abut against the annular surface of the one annular body in such a manner as to be flexurally deformed under a thrust load so as to make the fluid filling capacity of the closed recess small, or may be adapted to abut against the annular surface of the one annular body in such a manner as to be flexurally deformed under a thrust load so as to cause the fluid in the closed recess to generate internal pressure by making the fluid filling capacity of the closed recess small.

The closed recess may be surrounded by the projections such that an area of the closed recess opposing the annular surface of the one annular body is greater than an area of the projections which slidably abut against the annular surface of the one annular body, or may be surrounded by the projections such that an area of the fluid contacting the annular surface of the one annular body is greater than an area of the projections which slidably abut against the annular surface of the one annular body.

Further, the projections may include at least an inner annular projection located on an inner peripheral side and an outer annular projection located radially outwardly of the inner annular projection and disposed concentrically with the inner annular projection, or may include at least an inner annular projection located on an inner peripheral side, an outer annular projection located radially outwardly of the inner annular projection and disposed concentrically with the inner annular projection, and a plurality of radial protrusions extending radially and connected to respective ones of the inner annular projection and the outer annular projection.

The annular bodies are preferably formed of a synthetic resin, or formed of a synthetic resin including at least one of polyacetal resin, polyamide resin, polyester resin, polyolefin resin, polycarbonate resin, and fluororesin.

The one annular body may be formed of polyacetal resin, and the projections or the other annular body including the projections may be formed of a synthetic resin including at least one of polyamide resin, polyester resin, polyolefin resin, and fluororesin.

In the thrust sliding bearing according to another aspect of the invention, the upper annular body at a radially outer peripheral edge portion thereof is adapted to be resiliently fitted to the lower annular body at a radially outer peripheral edge portion of the lower annular body.

The fluid includes at least one of grease and lubricating oil, and is preferably silicone-based grease.

In the thrust sliding bearing in accordance with the invention, a labyrinth is formed between the annular bodies in at least one of radially outer peripheral edge portions and inner peripheral edge portions of the annular bodies.

Further, the projections are formed on the annular surface of the other annular body integrally with the other annular body, and the other annular body including the projections is integrally formed.

The other annular body has an annular member and an annular piece disposed between the annular member and the one annular body rotatably about an axis of the one annular body with respect to the one annular body, and the annular surface opposing the synthetic resin-made annular surface of the one annular body is formed on the annular piece, the projections being formed integrally on the annular surface.

The annular member and said annular piece are formed of a synthetic resin, and are preferably formed of a synthetic resin including at least one of polyacetal resin, polyamide resin, polyester resin, polyolefin resin, polycarbonate resin, and fluororesin. More preferably, the annular member is formed of polyacetal resin, and the annular piece is formed of a synthetic resin including at least one of polyamide resin, polyolefin resin, and fluororesin.

Preferably, the annular piece has another annular surface on a reverse side of the annular surface opposing the annular surface of the one annular body, and the annular member has a synthetic resin-made flat annular surface opposing the other annular surface of the annular piece, wherein another closed recess surrounded by synthetic resin-made other projections integrated with the annular piece and abutting slidably against the annular surface of the annular member is formed in the other annular surface of the annular piece, another fluid being adapted to be filled in the other closed recess. In the thrust sliding bearing according to such an aspect, preferably a thrust load is received by the other projections and the other fluid filled in the other closed recess.

The other projections may be adapted to abut against the annular surface of the annular member in such a manner as to be flexurally deformed under a thrust load so as to make the fluid filling capacity of the other closed recess small, or may be adapted to abut against the annular surface of the annular member in such a manner as to be flexurally deformed under a thrust load so as to cause the fluid in the other closed recess to generate internal pressure by making the fluid filling capacity of the other closed recess small. Further, the other closed recess may be surrounded by the other projections such that an area of the other closed recess opposing the annular surface of the annular member is greater than an area of the other projections which slidably abut against the annular surface of the annular member, or may be surrounded by the other projections such that an area of the fluid contacting the annular surface of the annular member is greater than an area of the other projections which slidably abut against the annular surface of the annular member.

Furthermore, the other projections may include at least another inner annular projection located on an inner peripheral side and another outer annular projection located radially outwardly of the other inner annular projection and disposed concentrically with the other inner annular projection, or may include at least another inner annular projection located on an inner peripheral side, another outer annular projection located radially outwardly of the other inner annular projection and disposed concentrically with the other inner annular projection, and a plurality of other radial protrusions extending radially and integrally connected to respective ones of the other inner annular projection and the other outer annular projection.

Preferably, the annular member is formed of polyacetal resin, and the annular piece and the other projections are formed of a synthetic resin including at least one of polyamide resin, polyolefin resin, and fluororesin.

In the invention, the other fluid includes at least one of grease and lubricating oil, and is preferably silicone-based grease.

The upper annular body at a radially outer peripheral edge portion thereof may be adapted to be resiliently fitted to the annular member at a radially outer peripheral edge portion of the annular member. Further, the annular piece may have another synthetic resin-made flat annular surface on a reverse side of the annular surface opposing the annular surface of the one annular body, and the annular member may have a synthetic resin-made flat annular surface opposing the other annular surface of the annular piece, wherein the other flat annular surface of the annular piece slidably abuts against the flat annular surface of the annular member.

In the thrust sliding bearing in accordance with the invention, a labyrinth may be formed between the upper annular body and the annular member in at least one of radially outer peripheral edge portions and inner peripheral edge portions of the upper annular body and the annular member.

The thrust sliding bearing in accordance with the invention is preferably for use in a strut-type suspension in a four-wheeled vehicle. Here, the one annular body may be one of an upper casing and a lower casing, and the other annular body may be another one of the upper casing and the lower casing. Alternatively, the one annular body may be an upper casing, and the other annular body may be constituted by a bearing piece and a lower casing. Still alternatively, the one annular body may be a lower casing, and the other annular body may be constituted by a bearing piece and an upper casing.

In accordance with the invention, it is possible to provide a synthetic resin-made thrust sliding bearing which makes it possible to form the sliding surface with an extremely low coefficient of friction equivalent to that of a rolling bearing, and maintain such a low coefficient of friction over long periods of use, and which is free of the occurrence of frictional noise at the sliding surface, and, when incorporated in the strut-type suspension, makes it possible to secure smooth steering operation equivalent to that of the rolling bearing.

Hereafter, a description will be given of the present invention and the mode for carrying out the invention with reference to the preferred embodiments shown in the drawings. It should be noted that the present invention is not limited to these embodiments.

EMBODIMENTS

Figure 1:
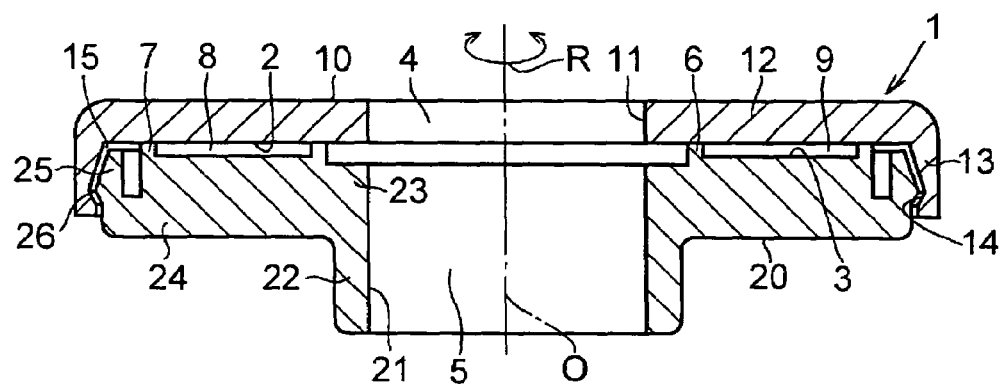
FIG. 1 is a cross-sectional view of a preferred embodiment of the invention.
Figure 2:
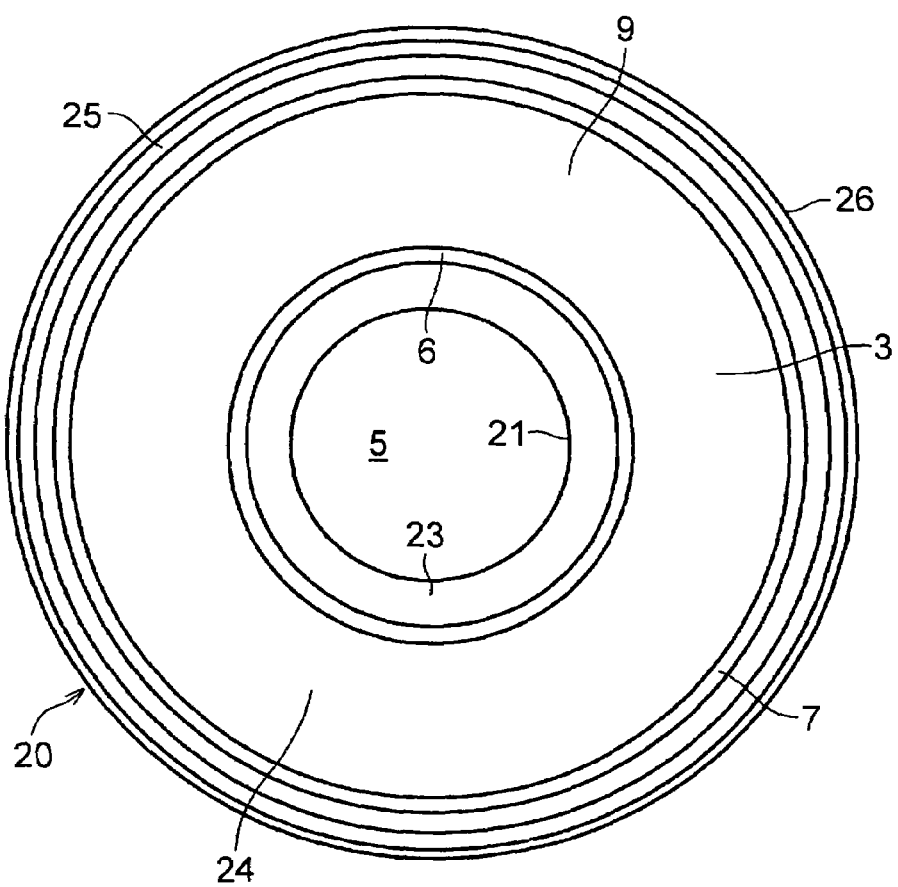
FIG. 2 is a plan view of a lower casing in accordance with the embodiment shown in FIG. 1.
Figure 3:
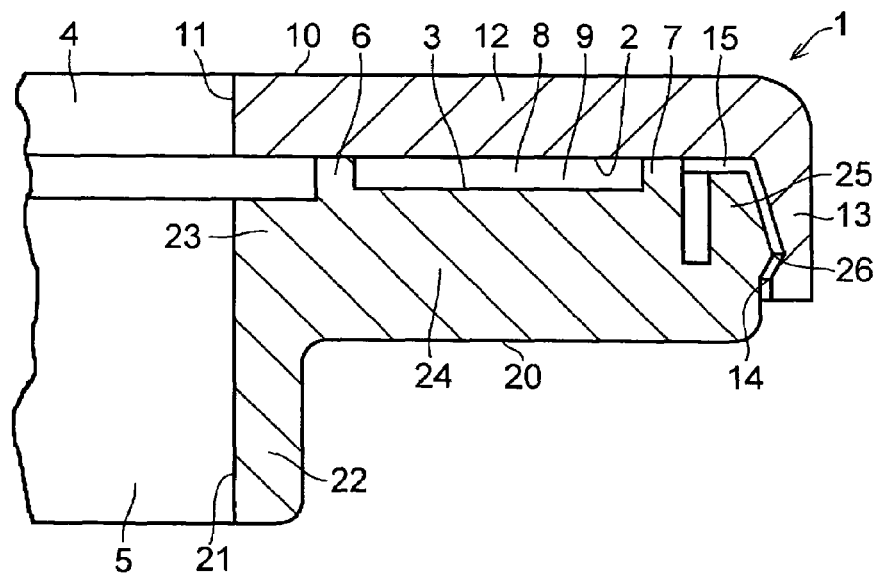
FIG. 3 is a partially enlarged view of the embodiment shown in FIG. 1.

In FIGS. 1 to 3, a thrust sliding bearing 1 for use in a strut-type suspension in a four-wheeled vehicle in accordance with this embodiment is comprised of an upper casing 10 which is made of polyacetal resin as a synthetic resin, has a flat annular surface 2, and serves as an upper annular body; and a lower casing 20 which is made of polyacetal resin as a synthetic resin, has an annular surface 3, and serves as a lower annular body. The lower casing 20 is superposed on the upper casing 10 so as to be rotatable about an axis O of the upper casing 10 in an R direction and is opposed to the annular surface 2 of the upper casing 10.

The synthetic resin-made upper casing 10 includes an annular upper casing body portion 12 having the annular surface 2 and an inner peripheral surface 11 for defining a circular hole 4 in a central portion; a cylindrical suspended engaging portion 13 formed integrally with an outer peripheral edge of the upper casing body portion 12; and an engaging hook portion 14 formed on an inner peripheral surface of the cylindrical suspended engaging portion 13.

The synthetic resin-made lower casing 20 includes mutually integrated hollow cylindrical portions 22 and 23 having an inner peripheral surface 21 for defining a circular hole 5 in a central portion; an annular lower case body portion 24 having the annular surface 3 and formed integrally with the hollow cylindrical portion 23; a cylindrical protruding engaging portion 25 formed integrally with an outer peripheral edge of the lower casing body portion 24; and an engaging portion 26 formed on an outer peripheral surface of the cylindrical protruding engaging portion 25.

The following are formed on the annular surface 3: synthetic resin-made protrusions for slidably abutting against the annular surface 2, i.e., in this embodiment, an inner annular projection 6 located on an inner peripheral side, as well as an outer annular projection 7 located radially outwardly of the inner annular projection 6 and disposed concentrically with the inner annular projection 6; and an annular closed recess 9 surrounded by the inner annular projection 6 and the outer annular projection 7 and filled fully with a fluid, i.e., silicone-based grease 8 in this embodiment. The inner annular projection 6 and the outer annular projection 7 are formed on the annular surface 3 integrally with the lower casing body portion 24. Thus, the lower casing 20 including the inner annular projection 6 and the outer annular projection 7 is integrally formed of a synthetic resin, i.e., polyacetal resin in this embodiment.

The closed recess 9 is surrounded by the inner annular projection 6 and the outer annular projection 7 such that its area opposing the annular surface 2 is greater than the total area of the inner annular projection 6 and the outer annular projection 7 which slidably abut against the annular surface 2. In other words, the closed recess 9 is surrounded by the inner annular projection 6 and the outer annular projection 7 such that the area of the silicone-based grease 8 contacting the annular surface 2 is greater than the area of the inner annular projection 6 and the outer annular projection 7 which slidably abut against the annular surface 2.

Under a thrust load, the inner annular projection 6 and the outer annular projection 7 are adapted to abut against the annular surface 2 in such a manner as to be flexurally deformed, so as to cause the silicone-based grease 8 in the closed recess 9 to generate internal pressure by making the fluid filling capacity of the closed recess 9 small.

The upper casing 10 at the engaging hook portion 14 of the cylindrical suspended engaging portion 13 of its radially outer peripheral edge portion is adapted to be resiliently engaged in a snap-fit fashion with the lower case 20 at the engaging portion 26 of the cylindrical protruding engaging portion 25 of the radially outer peripheral edge portion in the lower casing 20, so as to be resiliently fitted and secured at the engaging portion 26.

In at least one portions of the radially outer peripheral portions and inner peripheral portions of the upper casing 10 and the lower casing 20, i.e., the outer peripheral portions in this embodiment, a labyrinth 15 is arranged to be formed between the upper casing 10 and the lower casing 20 by the upper casing body portion 12 and the cylindrical suspended engaging portion 13 as well as the lower casing body portion 24 and the cylindrical protruding engaging portion 25. Entry of dust, muddy water, and the like from the outside into the closed recess 9 is prevented by the labyrinth 15 in addition to the outer annular projection 7. It should be noted that a labyrinth such as the one disclosed in JP-A-2001-173658, which is more complicated than such a labyrinth 15, may be formed.

Figure 4:
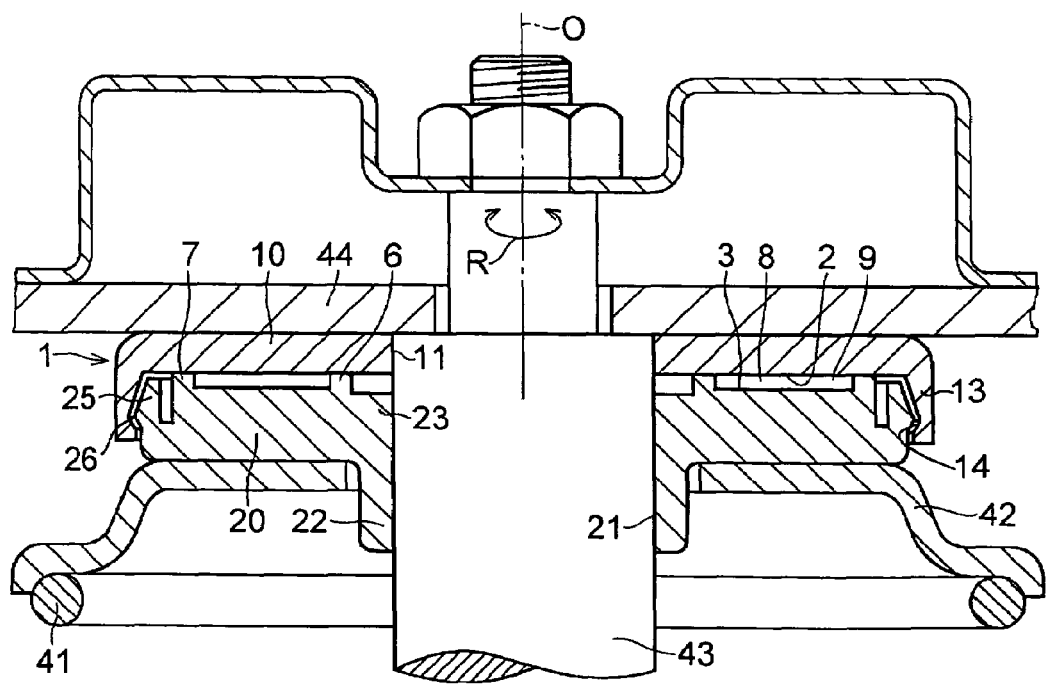
FIG. 4 is an explanatory diagram of an example in which the embodiment shown in FIG. 1 is incorporated in a strut-type suspension.

The above-described thrust sliding bearing 1 is used by being fitted between an upper spring seat 42 of a coil spring 41 in a strut-type suspension assembly on the one hand, and a mounting member 44 on the vehicle body side to which a piston rod 43 of a hydraulic damper is secured on the other hand, as shown in FIG. 4. In this case, an upper portion of the piston rod 43 is inserted in the circular holes 4 and 5 so as to be rotatable about the axis O in the R direction with respect to the upper casing 10 and the lower casing 20.

In the strut-type suspension assembly installed by means of the thrust sliding bearing 1, as shown in FIG. 4, at the time of the steering operation, the relative rotation of the upper spring seat 42 about the axis O in the R direction by means of the coil spring 41 is smoothly effected by the relative rotation of the lower casing 20 in the same direction with respect to the upper casing 10.

Then, according to the thrust sliding bearing 1, the closed recess 9, which is surrounded by the inner annular projection 6 and the outer annular projection 7 slidably abutting against the annular surface 2 of the upper casing 10, is formed on the annular surface 3, and the silicone-based grease 8 is arranged to be filled in such a closed recess 9. At the same time, under a thrust load, the inner annular projection 6 and the outer annular projection 7 are adapted to abut against the annular surface 2 in such a manner as to be flexurally deformed, so as to cause the silicone-based grease 8 in the closed recess 9 to generate internal pressure by making the fluid filling capacity of the closed recess 9 small. As a result, the thrust load can also be received in a shared manner by the silicone-based grease 8 filled in the closed recess 9. In other words, the sliding surface of the lower casing 20 with respect to the annular surface 2 of the upper casing 10 is constituted by the surfaces of the inner annular projection 6 and the outer annular projection 7 contacting the annular surface 2 of the upper casing 10, as well as the surface of the silicone-based grease 8 filled in the closed recess 9 and contacting the annular surface 2. Further, since the area of the surface of the silicone-based grease 8 filled in the closed recess 9 and contacting the annular surface 2 is set to be greater than the total area of the inner annular projection 6 and the outer annular projection 7 which slidably abut against the annular surface 2, the thrust load borne by the inner annular projection 6 and the outer annular projection 7 decreases substantially. Hence, the frictional resistance between the inner annular projection 6 and the outer annular projection 7 on the one hand, and the annular surface 2 on the other hand, is substantially reduced. At the same time, since the frictional resistance due to the surface of the silicone-based grease 8 contacting the annular surface 2 is extremely small, an extremely low frictional resistance is obtained as a whole. Accordingly, the relative rotation of the lower casing 20 about the axis O of the upper casing 10 in the R direction with respect to the upper casing 10 can be effected with an extremely low frictional resistance even under the thrust load. Moreover, since such silicone-based grease 8 is filled in the closed recess 9, it is possible to maintain a low coefficient of friction over long periods of use, and eliminate the occurrence of frictional noise at the sliding surface. Also, even when the thrust sliding bearing 1 is incorporated in the strut-type suspension, it is possible to secure smooth steering operation equivalent to that of the rolling bearing.

Figure 5:
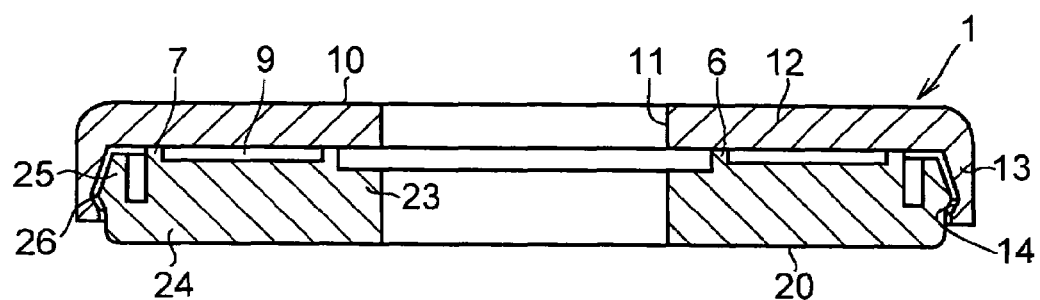
FIG. 5 is a cross-sectional view of another preferred embodiment of the invention.

It should be noted that although the thrust sliding bearing 1 in the above-described case is formed by the lower casing 20 having the cylindrical portions 22 and 23, the thrust sliding bearing 1 may be formed by the lower casing 20 having the cylindrical portion 23 by omitting the cylindrical portion 22, as shown in FIG. 5. Also with the thrust sliding bearing 1 shown in FIG. 5, advantages similar to those described above can be obtained.

In addition, in the thrust sliding bearing 1, the annular surface 2 of the upper casing 10, which is one of the upper casing 10 and the lower casing 20, is made of a synthetic resin and is flat. Meanwhile, the closed recess 9, which is surrounded by the synthetic resin-made inner annular projection 6 and outer annular projection 7 slidably abutting against the annular surface 2 of the upper casing 10, is formed on the annular surface 3 of the lower casing 20, which is the other one of the upper casing 10 and the lower casing 20. Further, the silicone-based grease 8 is arranged to be filled in the closed recess 9 as the fluid. Alternatively, as shown in FIG. 6, the thrust sliding bearing 1 may be constructed such that the annular surface 3 of the lower casing 20 is made of a synthetic resin and is flat, the annular closed recess 9, which is surrounded by the synthetic resin-made inner annular projection 6 and outer annular projection 7 slidably abutting against the annular surface 3 of the lower casing 20, is formed on the annular surface 2 of the upper casing 10, and the silicone-based grease 8 is filled in the closed recess 9 as the fluid, the other portions being arranged in substantially the same way as those shown in FIG. 1.

Figure 6:
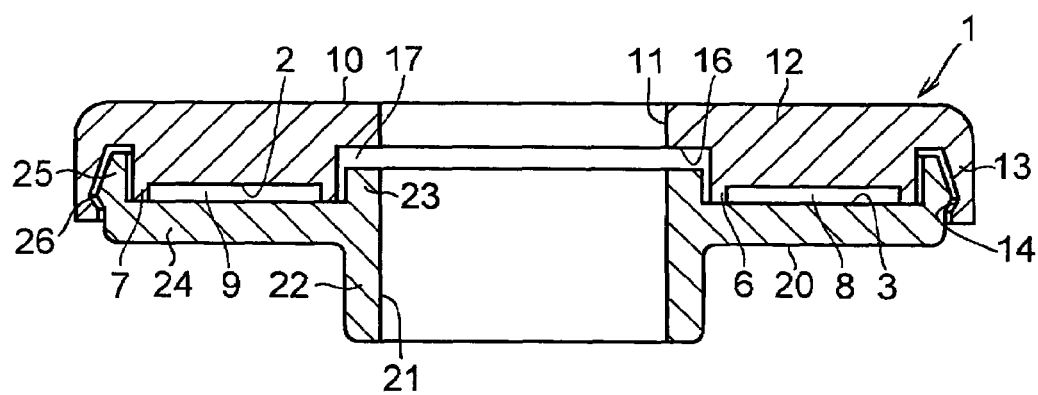
FIG. 6 is a cross-sectional view of still another preferred embodiment of the invention.

Also with the thrust sliding bearing 1 shown in FIG. 6, the closed recess 9, which is surrounded by the inner annular projection 6 and the outer annular projection 7 slidably abutting against the annular surface 3 of the lower casing 20, is formed on the annular surface 2, and the silicone-based grease 8 is arranged to be filled in such a closed recess 9 as the fluid. At the same time, under a thrust load, the inner annular projection 6 and the outer annular projection 7 are adapted to abut against the annular surface 3 in such a manner as to be flexurally deformed, so as to cause the silicone-based grease 8 in the closed recess 9 to generate internal pressure by making the fluid filling capacity of the closed recess 9 small. As a result, the thrust load can also be received in a shared manner by the silicone-based grease 8 filled in the closed recess 9. In other words, the sliding surface of the upper casing 10 with respect to the annular surface 3 of the lower casing 20 is constituted by the surfaces of the inner annular projection 6 and the outer annular projection 7 contacting the annular surface 3 of the lower casing 20, as well as the surface of the silicone-based grease 8 filled in the closed recess 9 and contacting the annular surface 3. Further, since the area of the surface of the silicone-based grease 8 filled in the closed recess 9 and contacting the annular surface 3 is set to be greater than the total area of the inner annular projection 6 and the outer annular projection 7 which slidably abut against the annular surface 3, the thrust load borne by the inner annular projection 6 and the outer annular projection 7 decreases substantially. Hence, the frictional resistance between the inner annular projection 6 and the outer annular projection 7 on the one hand, and the annular surface 3 on the other hand, is substantially reduced. At the same time, since the frictional resistance due to the surface of the silicone-based grease 8 contacting the annular surface 3 is extremely small, an extremely low frictional resistance is obtained as a whole.

Accordingly, the relative rotation of the lower casing 20 about the axis O of the upper casing 10 in the R direction with respect to the upper casing 10 can be effected with an extremely low frictional resistance even under the thrust load. Moreover, since such silicone-based grease 8 is filled in the closed recess 9, it is possible to maintain a low coefficient of friction over long periods of use, and eliminate the occurrence of frictional noise at the sliding surface. Also, even when the thrust sliding bearing 1 is incorporated in the strut-type suspension, it is possible to secure smooth steering operation equivalent to that of the rolling bearing.

It should be noted that, as in the thrust sliding bearing 1 shown in FIG. 6, a labyrinth 17 may be formed also between the upper casing 10 and the lower casing 20 at the radial inner peripheral edge portions of the upper casing 10 and the lower casing 20 by a stepped portion 16 of the upper casing body portion 12 and the cylindrical portion 23 of the lower casing 20. In addition, a labyrinth such as the one disclosed in JP-A-2001-173658, which is more complicated than such a labyrinth 17, may be formed at the radial inner peripheral edge portions of the upper casing 10 and the lower casing 20.

Figure 7:
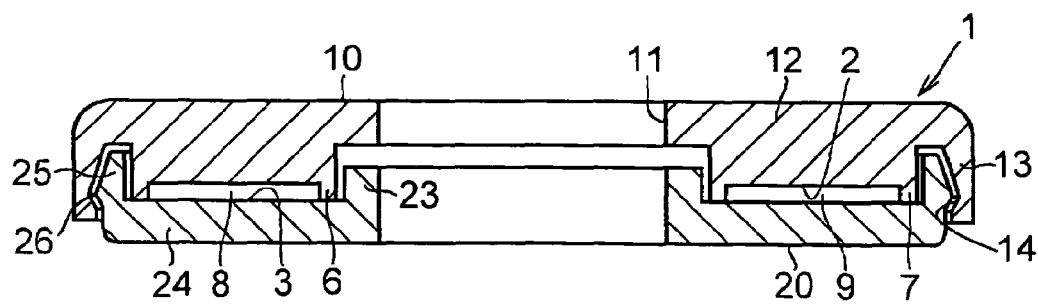
FIG. 7 is a cross-sectional view of a further preferred embodiment of the invention.

Furthermore, although the thrust sliding bearing 1 shown in FIG. 6 is formed by the lower casing 20 having the cylindrical portions 22 and 23, the thrust sliding bearing 1 may be formed by the lower casing 20 having the cylindrical portion 23 by omitting the cylindrical portion 22, as shown in FIG. 7. Also with the thrust sliding bearing 1 shown in FIG. 7, advantages similar to those described above can be obtained.

Figure 8:
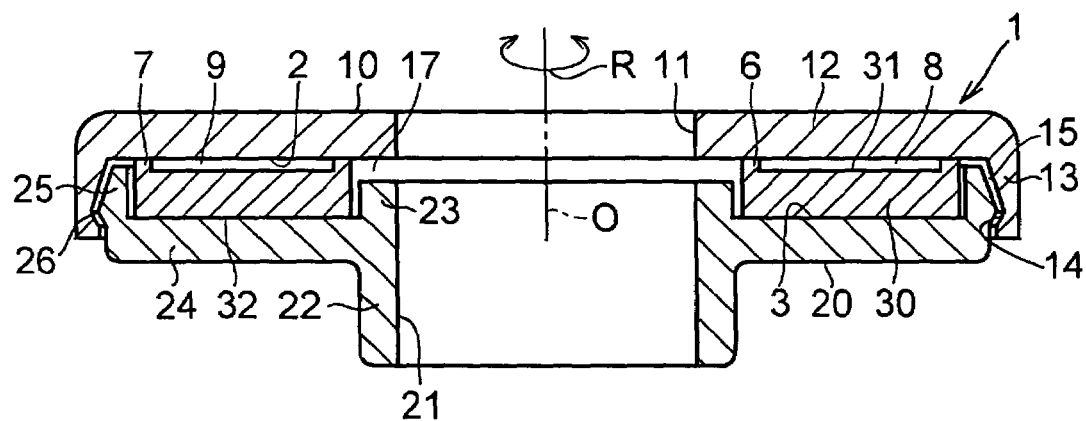
FIG. 8 is a cross-sectional view of a still further preferred embodiment of the invention.
Figure 9:
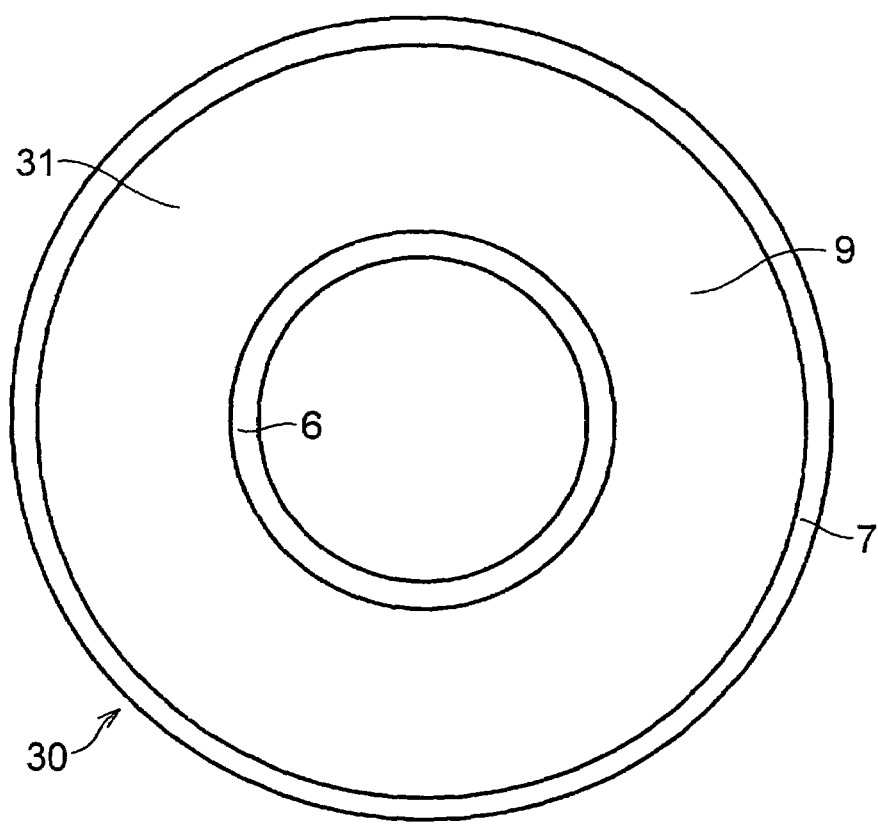
FIG. 9 is a plan view of a bearing piece in accordance with the embodiment shown in FIG. 8.

In addition, the thrust sliding bearing 1 in the above-described case is formed by the upper casing 10 as the upper annular body and the lower casing 20 as the lower annular body. However, the thrust sliding bearing 1 may alternatively be formed such that, as shown in FIGS. 8 and 9, the upper casing 10 shown in FIG. 1 is used as either one of the annular bodies between the two annular bodies, and the other one of the two annular bodies is comprised of the lower casing 20 shown in FIG. 6 as the annular body and an annular synthetic resin-made bearing piece 30 as an annular piece. Thus, the thrust sliding bearing 1 may be embodied by such an upper casing 10, lower casing 20, and bearing piece 30. Here, the bearing piece 30 is disposed between the lower casing 20 and the upper casing 10 serving as one annular body so as to be rotatable about the axis O of the upper casing 10 in the R direction with respect to the upper casing 10. In this embodiment, the bearing piece 30 is formed of a resin including at least one of polyamide resin, polyolefin resin, and fluororesin. An annular surface 31 opposing the synthetic resin-made annular surface 2 of the upper casing 10 as one annular body is formed on the bearing piece 30. Further, the inner annular projection 6 and the outer annular projection 7, which are formed of a synthetic resin including at least one of polyamide resin, polyolefin resin, and fluororesin, are integrally formed on that annular surface 31. Furthermore, the closed recess 9 is formed by being surrounded by the inner annular projection 6 and outer annular projection 7, and the silicone-based grease 8 is fully filled in the closed recess 9. Such a bearing piece 30 in this embodiment has another synthetic resin-made flat annular surface 32 on reverse side of the annular surface 31, and the annular surface 32 slidably abuts against the flat annular surface 3 of the lower casing 20.

Also in the thrust sliding bearing 1 shown in FIGS. 8 and 9, the closed recess 9 is surrounded by the inner annular projection 6 and the outer annular projection 7 such that its area opposing the annular surface 2 is greater than the area of the inner annular projection 6 and the outer annular projection 7 which slidably abut against the annular surface 2. In other words, the closed recess 9 is surrounded by the inner annular projection 6 and the outer annular projection 7 such that the area of the silicone-based grease 8 contacting the annular surface 2 is greater than the area of the inner annular projection 6 and the outer annular projection 7 which slidably abut against the annular surface 2. Under a thrust load, the inner annular projection 6 and the outer annular projection 7 are adapted to abut against the annular surface 2 in such a manner as to be flexurally deformed, so as to cause the silicone-based grease 8 in the closed recess 9 to generate internal pressure by making the fluid filling capacity of the closed recess 9 small.

In the strut-type suspension assembly installed by means of the thrust sliding bearing 1 shown in FIGS. 8 and 9, at the time of the steering operation, the relative rotation of the upper spring seat 42 about the axis O in the R direction by means of the coil spring 41 is effected by the rotation of the lower casing 20 through the relative smooth rotation of the bearing piece 30 in the same direction with respect to the upper casing 10. Further, in the thrust sliding bearing 1 shown in FIGS. 8 and 9, the closed recess 9, which is surrounded by the inner annular projection 6 and the outer annular projection 7 slidably abutting against the annular surface 2 of the upper casing 10, is formed on the annular surface 31, and the silicone-based grease 8 is arranged to be filled in such a closed recess 9 as the fluid. At the same time, under a thrust load, the inner annular projection 6 and the outer annular projection 7 are adapted to abut against the annular surface 2 in such a manner as to be flexurally deformed, so as to cause the silicone-based grease 8 in the closed recess 9 to generate internal pressure by making the fluid filling capacity of the closed recess 9 small. As a result, the thrust load also can be received in a shared manner by the silicone-based grease 8 filled in the closed recess 9. In other words, the sliding surface of the bearing piece 30 with respect to the annular surface 2 of the upper casing 10 is constituted by the surfaces of the inner annular projection 6 and the outer annular projection 7 contacting the annular surface 2 of the upper casing 10, as well as the surface of the silicone-based grease 8 filled in the closed recess 9 and contacting the annular surface 2. Further, since the area of the surface of the silicone-based grease 8 filled in the closed recess 9 and contacting the annular surface 2 is set to be greater than the total area of the inner annular projection 6 and the outer annular projection 7 which slidably abut against the annular surface 2, the thrust load borne by the inner annular projection 6 and the outer annular projection 7 decreases substantially. Hence, the frictional resistance between the inner annular projection 6 and the outer annular projection 7 on the one hand, and the annular surface 2 on the other hand, is substantially reduced. At the same time, since the frictional resistance due to the surface of the silicone-based grease 8 contacting the annular surface 2 is extremely small, an extremely low frictional resistance is obtained as a whole. Accordingly, the relative rotation of the lower casing 20 about the axis O of the upper casing 10 in the R direction with respect to the upper casing 10 through the bearing piece 30 can be effected with an extremely low frictional resistance even under the thrust load. Moreover, since such silicone-based grease 8 is filled in the closed recess 9, it is possible to maintain a low coefficient of friction over long periods of use, and eliminate the occurrence of frictional noise at the sliding surface. Also, even when the thrust sliding bearing 1 is incorporated in the strut-type suspension, it is possible to secure smooth steering operation equivalent to that of the rolling bearing.

In the thrust sliding bearing 1 shown in FIGS. 8 and 9, the casing 20 and the bearing piece 30 are formed of a synthetic resin, and the bearing piece 30 including the inner annular projection 6 and the outer annular projection 7 is formed of a synthetic resin including at least one of polyamide resin, polyolefin resin, and fluororesin.

Figure 10:
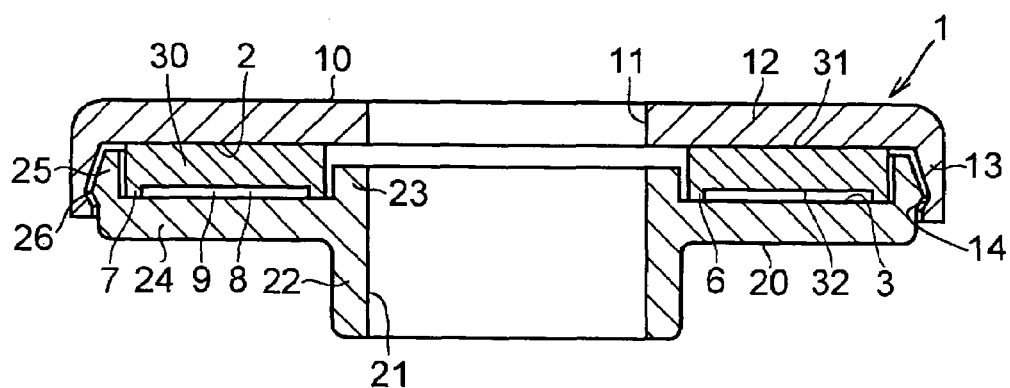
FIG. 10 is a cross-sectional view of a further preferred embodiment of the invention.

In the thrust sliding bearing 1 shown in FIGS. 8 and 9, the inner annular projection 6 and the outer annular projection 7 are abutted against the annular surface 2, and the bearing piece 30 is disposed between the lower casing 20 and the upper casing 10. Alternatively, however, as shown in FIG. 10, the thrust sliding bearing 1 may be constructed as follows: Namely, the lower casing 20 shown in FIG. 6 or 8 is used as either one of the annular bodies between the two annular bodies, and the other annular body is comprised of the upper casing 10 shown in FIG. 1 or 8 and the bearing piece 30. The inner annular projection 6 and the outer annular projection 7, which are formed of a synthetic resin including at least one of polyamide resin, polyolefin resin, and fluororesin, are integrally formed on the annular surface 32 on the reverse side of the annular surface 31 of the bearing piece 30. Furthermore, the closed recess 9 is formed by being surrounded by the inner annular projection 6 and outer annular projection 7, and the silicone-based grease 8 is fully filled in the closed recess 9. On the other hand, the thrust sliding bearing 1 may be formed such that the annular surface 31 of the bearing piece 30 is made flat, and such an annular surface 31 is slidably abutted against the annular surface 2 of the upper case 10. Also with the thrust sliding bearing 1 shown in FIG. 10, the thrust load can be received in a shared manner by the silicone-based grease 8 filled in the closed recess 9. As a result, at the time of the steering operation, the relative rotation of the upper spring seat 42 about the axis in the R direction by means of the coil spring 41 is effected with the relative smooth rotation of the lower casing 20 in the same direction with respect to the bearing piece 30. Thus, it is possible to exhibit advantages similar to those of the thrust sliding bearing 1 shown in FIGS. 8 and 9.

Figure 11:
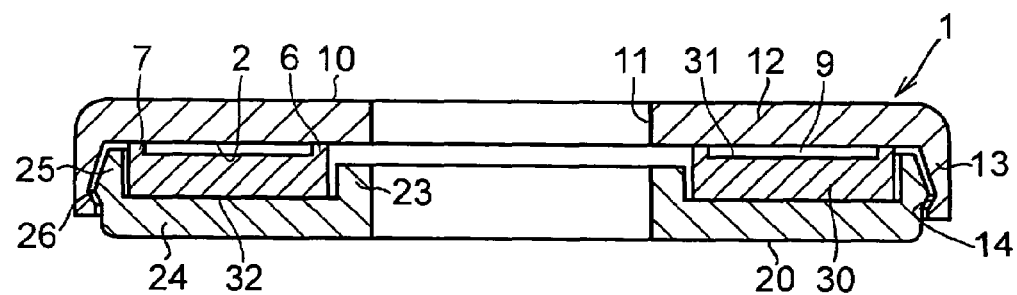
FIG. 11 is a cross-sectional view of a still further preferred embodiment of the invention.

In addition, as shown in FIG. 11, the thrust sliding bearing 1 shown in FIGS. 8 and 9 may be formed by the lower casing 20 having the cylindrical portion 23 by omitting the cylindrical portion 22. Also with the thrust sliding bearing 1 shown in FIG. 11, advantages similar to those described above can be obtained. Incidentally, the thrust sliding bearing 1 shown in FIG. 10 may also be formed by the lower casing 20 having the cylindrical portion 23 by omitting the cylindrical portion 22.

Figure 12:
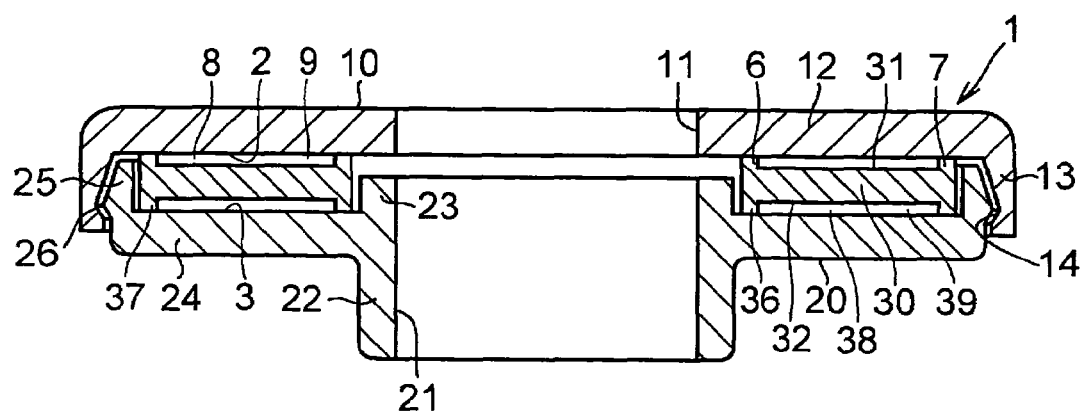
FIG. 12 is a cross-sectional view of a still further preferred embodiment of the invention.

Further, in the thrust sliding bearing 1 shown in FIGS. 8 and 9, the annular surface 32 on the reverse side of the annular surface 31 of the bearing piece 30 is made flat, and such a flat annular surface 32 is slidably abutted against the flat annular surface 3 of the lower casing 20 opposing that flat annular surface 32. Alternatively, however, as shown in FIG. 12, the thrust sliding bearing 1 may be formed as follows: An inner peripheral-side inner annular projection 36 and as an outer annular projection 37 located radially outwardly of the inner annular projection 36 and disposed concentrically with the inner annular projection 36 are formed on the annular surface 32 of the bearing piece 30 as other protrusions integrated with the bearing piece 30 and abutting slidably against the annular surface 3 of the lower casing 20. Another annular closed recess 39 surrounded by such a inner annular projection 36 and outer annular projection 37 is formed, and silicone-based grease 38 is filled in the closed recess 39 as another fluid. The inner annular projection 36 and the outer annular projection 37 are abutted against the annular surface 3 of the lower casing 20 and are flexurally deformed under the thrust load. This flexural deformation makes the fluid filling capacity of the closed recess 39 small to cause the silicone-based grease 8 in the closed recess 39 to generate internal pressure. Thus, the thrust load is received by the inner annular projection 36 and the outer annular projection 37 and by the silicone-based grease 38 filled in the closed recess 39.

It suffices if the closed recess 39 of the thrust sliding bearing 1 shown in FIG. 12 is also surrounded by the inner annular projection 36 and the outer annular projection 37 such that its area opposing the annular surface 3 of the lower casing 20 is greater than the area of the inner annular projection 36 and the outer annular projection 37 which slidably abut against the annular surface 3 of the lower casing 20. In other words, the closed recess 39 is also surrounded by the inner annular projection 36 and the outer annular projection 37 such that the area of the silicone-based grease 38 contacting the annular surface 3 of the lower casing 20 is greater than the area of the inner annular projection 36 and the outer annular projection 37 which slidably abut against the annular surface 3 of the lower casing 20.

With the thrust sliding bearing 1 shown in FIG. 12, the thrust load can also be received in a shared manner by the silicone-based grease 8 and 38 filled in the closed recesses 9 and 39. As a result, at the time of the steering operation, the relative rotation of the upper spring seat 42 about the axis O in the R direction by means of the coil spring 41 is effected with the relative smooth rotation of the upper casing 10 or the lower casing 20, which is determined by the smaller frictional resistance between the closed recess 9 side and the closed recess 39 side, in the same direction with respect to the bearing piece 30. Thus, it is possible to exhibit advantages similar to those of the thrust sliding bearing 1 shown in FIGS. 8 and 9.

Figure 13:
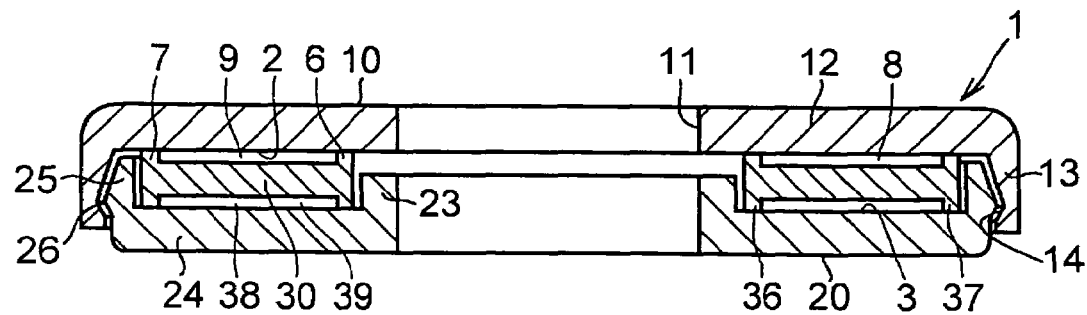
FIG. 13 is a cross-sectional view of a still further preferred embodiment of the invention.

As shown in FIG. 13, the thrust sliding bearing 1 shown in FIG. 12 may also be formed by the lower casing 20 having the cylindrical portion 23 by omitting the cylindrical portion 22. Also with the thrust sliding bearing 1 shown in FIG. 13, advantages similar to those described above can be obtained.

Figure 14:
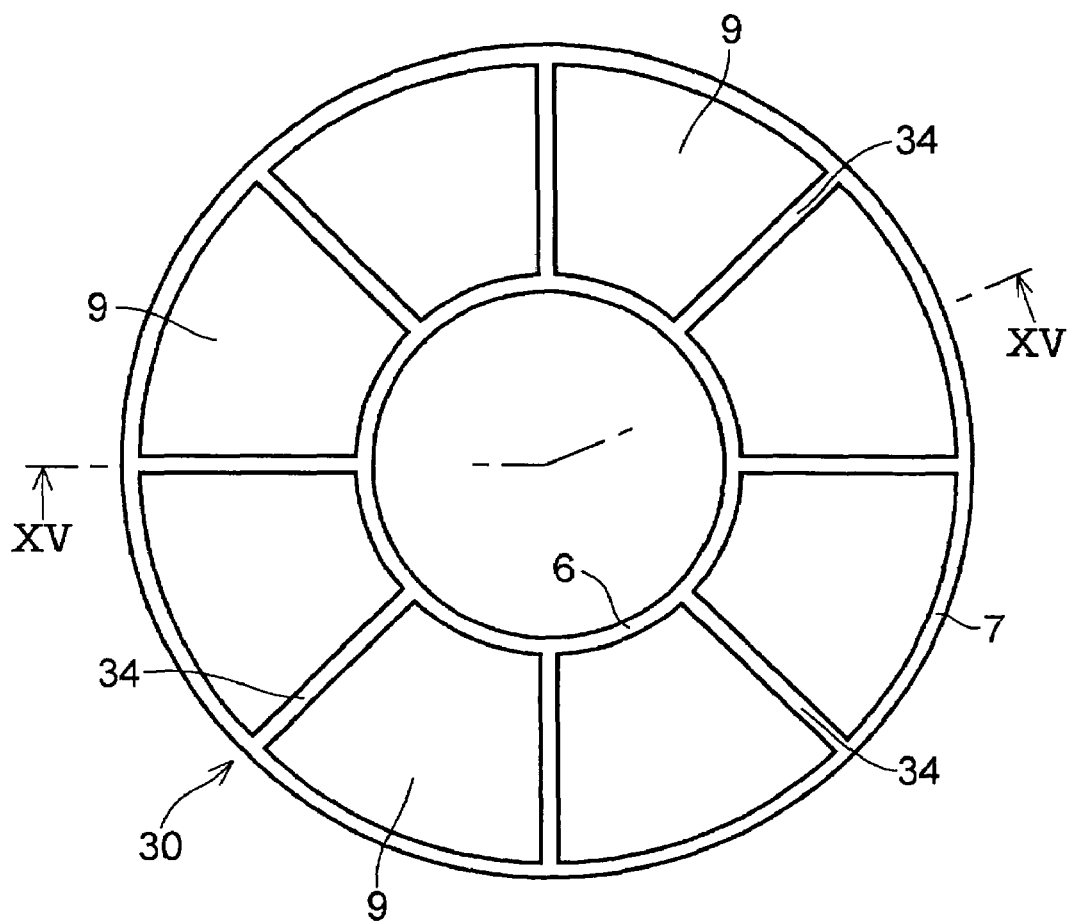
FIG. 14 is a plan view of another example of the bearing piece in accordance with the embodiment shown in FIG. 12.
Figure 15:
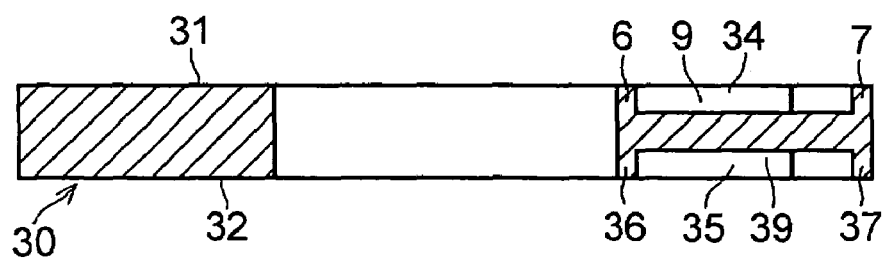
FIG. 15 is a cross-sectional view taken along line XV-XV shown in FIG. 14.

In addition, with the thrust sliding bearing 1 shown in FIG. 12, the protrusions are realized by the inner annular projections 6 and 36 and the outer annular projections 7 and 37 which are integrally formed on the bearing piece 30. Alternatively, however, as shown in FIGS. 14 and 15, the protrusions may be realized by a plurality of radial protrusions 34 and 35 extending radially and connected to the respective ones of the inner annular projections 6 and 36 and the outer annular projections 7 and 37, in addition to the inner annular projections 6 and 36 and the outer annular projections 7 and 37. In the bearing piece 30 shown in FIGS. 14 and 15, a plurality of mutually independent closed recesses 9 and 39 are formed on the respective annular surfaces 31 and 32, and the plurality of closed recesses 9 and 39 may be fully filled with the silicone-based grease 8 and 38.

It should be noted that the protrusions shown in FIGS. 14 and 15 may be used in each of the above-described thrust sliding bearings 1.

Figure 16:
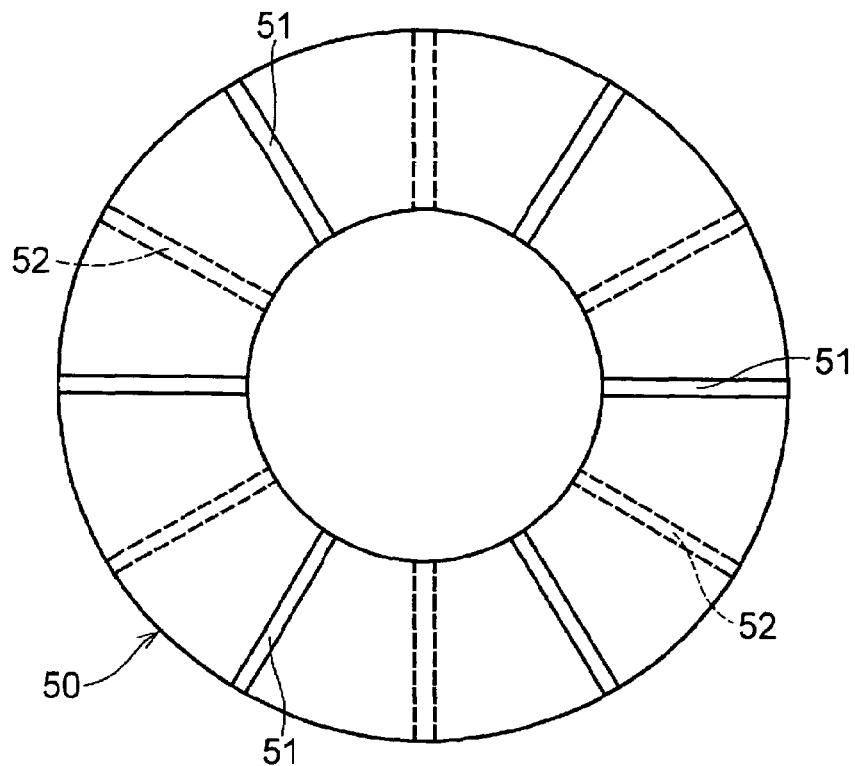
FIG. 16 is a plan view of the bearing piece of a comparative product.

The following pieces were prepared: An invented product A as the thrust sliding bearing 1 of the shape shown in FIG. 13, in which the upper casing 10 and the lower casing 20 were formed of polyacetal resin, the bearing piece 30 including the inner annular projections 6 and 36 and the outer annular projections 7 and 37 was formed of polyolefin resin, and each of the closed recesses 9 and 39 was filled with the silicone-based grease 8 and 38; an invented product B in which the upper casing 10 and the lower casing 20 were formed of polyacetal resin, the bearing piece 30 including the inner annular projections 6 and 36 and the outer annular projections 7 and 37 was formed of a tetrafluoroethylene-perfluoroalkoxyethylene copolymer which is one of fluororesins, and each of the closed recesses 9 and 39 was filled with the silicone-based grease 8 and 38; and a comparative product in which the upper casing 10 and the lower casing 20 were formed of polyacetal resin, a bearing piece 50 of a structure not having the closed recess but having a plurality of lubricating grooves 51 and 52 penetratingly extending radially from the inner peripheral side toward the outer peripheral side, as shown in FIG. 16, was formed of polyolefin resin, and the lubricating grooves 51 and 52 were filled with silicone-based grease. Table 1 and FIG. 17 show the results of measurement of rotational torque in a case where, in a state in which a thrust load of 5 kN to 8 kN was applied to the invented product A, the invented product B, and the comparative product, respectively, at room temperature, relative rotation in the R direction at ±40° was applied between the upper casing 10 and the lower casing 20 at a velocity of 0.5 Hz

TABLE 1

|  | Thrust load (kN) | | | |
| --- | --- | --- | --- | --- |
|  | 5 | 6 | 7 | 8 |
| Rotational torque of comparative product, (Nm) | 2.96 | 3.46 | 3.80 | 4.00 |
| Rotational torque of invented product A, (Nm) | 2.68 | 2.71 | 2.74 | 2.75 |
| Rotational torque of invented product B, (Nm) | 1.36 | 1.38 | 1.40 | 0.42 |

Figure 17:
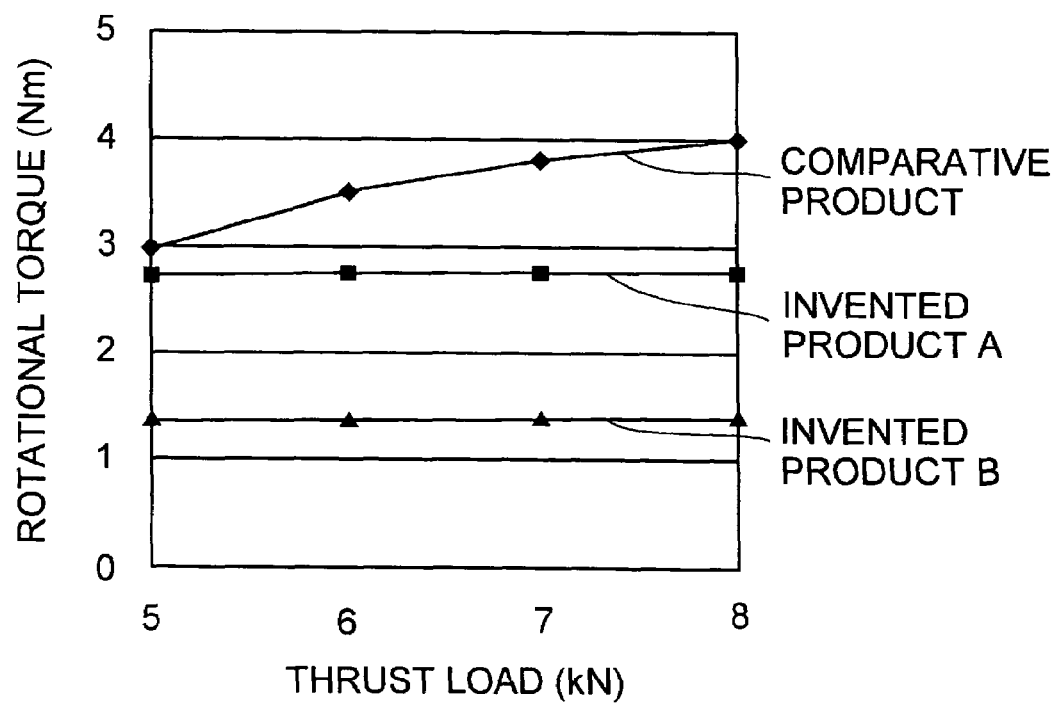
FIG. 17 is a diagram illustrating the results of measurement of the comparative product and invented products in accordance with the invention.

As is apparent from Table 1 and FIG. 17, according to the thrust sliding bearing 1, it is possible to obtain small frictional resistance irrespective of the thrust load. It was found that particularly in a case where the bearing piece 30 formed of fluororesin was used, frictional resistance comparable to the rolling bearing can be obtained.

The invention claimed is:

1. A thrust sliding bearing comprising:
an upper annular body having an annular surface; and
a lower annular body having an annular surface opposing the annular surface of said upper annular body and superposed on said upper annular body so as to be rotatable about an axis of said upper annular body;
the annular surface of one of said annular bodies being formed of a synthetic resin and being flat, a closed recess surrounded by synthetic resin-made projections abutting slidably against the annular surface of said one annular body being formed in the annular surface of another one of said annular bodies, and a fluid being filled in said closed recess to be in contact with the annular surface of said one annular body, said other annular body having an annular member and an annular piece disposed between said annular member and said one annular body rotatably about an axis of said one annular body with respect to said one annular body, the annular surface of said other annular body opposing the synthetic resin-made annular surface of said one annular body being formed on said annular piece, said projections being formed integrally on the annular surface of the annular piece, which has another annular surface on a reverse side of the annular surface of the annular piece opposing the annular surface of said one annular body, said annular member having a synthetic resin-made flat annular surface opposing the other annular surface of said annular piece, said closed recess being surrounded by said projections such that an area of said closed recess opposing the annular surface of said one annular body is greater than an area of said projections which slidably abut against the annular surface of said one annular body.

2. The thrust sliding bearing according to claim 1, wherein a thrust load is received by said projections and the fluid filled in said closed recess.

3. The thrust sliding bearing according to claim 1, wherein said projections are adapted to abut against the annular surface of said one annular body in such a manner as to be flexurally deformed under a thrust load so as to make the fluid filling capacity of said closed recess small.

4. The thrust sliding bearing according to claim 1, wherein said projections are adapted to abut against the annular surface of said one annular body in such a manner as to be flexurally deformed under a thrust load so as to cause the fluid in said closed recess to generate internal pressure by making the fluid filling capacity of said closed recess small.

5. The thrust sliding bearing according to claim 1, wherein said projections include at least an inner annular projection located on an inner peripheral side and an outer annular projection located radially outwardly of said inner annular projection and disposed concentrically with said inner annular projection.

6. The thrust sliding bearing according to claim 1, wherein said annular bodies are formed of a synthetic resin.

7. The thrust sliding bearing according to claim 1, wherein said annular bodies are formed of a synthetic resin including at least one of polyacetal resin, polyamide resin, polyester resin, polyolefin resin, polycarbonate resin, and fluororesin.

8. The thrust sliding bearing according to claim 1, wherein said one annular body is formed of polyacetal resin, and said projections or said other annular body including said projections are formed of a synthetic resin including at least one of polyamide resin, polyolefin resin, and fluororesin.

9. The thrust sliding bearing according to claim 1, wherein said upper annular body at a radially outer peripheral edge portion thereof is adapted to be resiliently fitted to said lower annular body at a radially outer peripheral edge portion of said lower annular body.

10. The thrust sliding bearing according to claim 1, wherein the fluid includes at least one of grease and lubricating oil.

11. The thrust sliding bearing according to claim 1, wherein the fluid is silicone-based grease.

12. The thrust sliding bearing according to claim 1, wherein a labyrinth is formed between said annular bodies in at least one of radially outer peripheral edge portions and inner peripheral edge portions of said annular bodies.

13. The thrust sliding bearing according to claim 1, wherein said annular member and said annular piece are formed of a synthetic resin.

14. The thrust sliding bearing according to claim 1, wherein said annular member and said annular piece are formed of a synthetic resin including at least one of polyacetal resin, polyamide resin, polyester resin, polyolefin resin, polycarbonate resin, and fluororesin.

15. The thrust sliding bearing according to claim 1, wherein said annular member is formed of polyacetal resin, and said annular piece is formed of a synthetic resin including at least one of polyamide resin, polyolefin resin, and fluororesin.

16. The thrust sliding bearing according to claim 1, wherein another closed recess surrounded by synthetic resin-made other projections integrated with said annular piece and abutting slidably against the annular surface of said annular member is formed in the other annular surface of said annular piece, another fluid being adapted to be filled in said other closed recess.

17. The thrust sliding bearing according to claim 16, wherein a thrust load is received by said other projections and the other fluid filled in said other closed recess.

18. The thrust sliding bearing according to claim 16, wherein said other projections are adapted to abut against the annular surface of said annular member in such a manner as to be flexurally deformed under a thrust load so as to make the fluid filling capacity of said other closed recess small.

19. The thrust sliding bearing according to claim 16, wherein said other projections are adapted to abut against the annular surface of said annular member in such a manner as to be flexurally deformed under a thrust load so as to cause the fluid in said other closed recess to generate internal pressure by making the fluid filling capacity of said other closed recess small.

20. The thrust sliding bearing according to claim 16, wherein said other projections include at least another inner annular projection located on an inner peripheral side and another outer annular projection located radially outwardly of said other inner annular projection and disposed concentrically with said other inner annular projection.

21. The thrust sliding bearing according to claim 16, wherein said annular member is formed of polyacetal resin, and said annular piece and said other projections are formed of a synthetic resin including at least one of polyamide resin, polyolefin resin, and fluororesin.

22. The thrust sliding bearing according to claim 16, wherein the other fluid includes at least one of grease and lubricating oil.

23. The thrust sliding bearing according to claim 16, wherein the other fluid is silicone-based grease.

24. The thrust sliding bearing according to claim 16, wherein said upper annular body at a radially outer peripheral edge portion thereof is adapted to be resiliently fitted to said annular member at a radially outer peripheral edge portion of said annular member.

25. The thrust sliding bearing according to claim 1, wherein said other annular surface of said annular piece is formed of synthetic resin and is flat, the other annular surface of said annular piece slidably abuts against the flat annular surface of said annular member.

26. The thrust sliding bearing according to claim 1, wherein a labyrinth is formed between said upper annular body and said annular member in at least one of radially outer peripheral edge portions and inner peripheral edge portions of said upper annular body and said annular member.

27. The thrust sliding bearing according to claim 1, wherein said one annular body is one of an upper casing and a lower casing, and said other annular body is another one of said upper casing and said lower casing.

28. The thrust sliding bearing according to claim 1, wherein said one annular body is an upper casing, and said other annular body is constituted by a bearing piece and a lower casing.

29. The thrust sliding bearing according to claim 1, wherein said one annular body is a lower casing, and said other annular body is constituted by a bearing piece and an upper casing.

* * * * *